United States Patent
Schubert (10) Patent No.: US 7,118,075 B2
(45) Date of Patent: Oct. 10, 2006

(54) SYSTEM AND METHOD FOR ATTITUDE CONTROL AND STATION KEEPING

(76) Inventor: Peter J. Schubert, 310 W. Greyhound Pass, Carmel, IN (US) 46032

( * ) Notice: Subject to any disclaimer, the term of this patent is extended or adjusted under 35 U.S.C. 154(b) by 14 days.

(21) Appl. No.: 10/710,004

(22) Filed: Jun. 11, 2004

(65) Prior Publication Data
US 2005/0001102 A1  Jan. 6, 2005

Related U.S. Application Data

(60) Provisional application No. 60/320,268, filed on Jun. 13, 2003.

(51) Int. Cl.
*B64G 1/26* (2006.01)
(52) U.S. Cl. .................. 244/169; 244/171.2; 60/203.1
(58) Field of Classification Search ............... 244/172, 244/169, 53 R, 73, 171.1, 171.2; 60/203.1, 60/256, 202
See application file for complete search history.

(56) References Cited

U.S. PATENT DOCUMENTS

| | | | | |
|---|---|---|---|---|
| 3,072,363 A | * | 1/1963 | Baumann et al. | ............ 244/169 |
| 3,097,480 A | * | 7/1963 | Sohn | .......................... 60/203.1 |
| 3,258,910 A | * | 7/1966 | Seymour | ....................... 60/256 |
| 3,270,983 A | * | 9/1966 | Adams et al. | ............... 244/169 |
| 3,392,527 A | * | 7/1968 | Gilmour, Jr. et al. | ......... 60/202 |
| 3,825,211 A | * | 7/1974 | Minovitch | .................... 244/172 |
| 3,891,160 A | * | 6/1975 | Minovitch | .............. 244/158 R |
| 4,036,012 A | * | 7/1977 | Monsler | ..................... 60/203.1 |
| 4,585,191 A | * | 4/1986 | Blount | ......................... 244/169 |
| 6,032,904 A | * | 3/2000 | Hosick et al. | ............... 244/169 |
| 6,488,233 B1 | * | 12/2002 | Myrabo | ......................... 244/62 |
| 6,530,212 B1 | * | 3/2003 | Phipps et al. | ............... 60/203.1 |
| 6,945,500 B1 | * | 9/2005 | Wingo | ......................... 244/169 |

* cited by examiner

*Primary Examiner*—Galen Barefoot
(74) *Attorney, Agent, or Firm*—Gary M. Hartman; Domenica N. S. Hartman; Hartman & Hartman (57) ABSTRACT

A system and method for supplying thrust to a structure, such as a satellite or spacecraft, for the purposes of station keeping and attitude control of the structure in low-gravity (orbital) and zero-gravity environments. The system includes devices for emitting energy beams and targets impacted by the energy beams to cause ablation of the targets. The beam-emitting devices and targets are adapted to cooperate and cause the structure to selectively undergo translational and/or rotational motion in reaction to the motion of material ablated from the targets. The position, alignment, and/or attitude of the structure can thereby be controlled in a zero or low-gravity environment by selectively emitting the energy beams at the targets.

38 Claims, 5 Drawing Sheets

SYSTEM AND METHOD FOR ATTITUDE CONTROL AND STATION KEEPING

CROSS REFERENCE TO RELATED APPLICATIONS

This application claims the benefit of U.S. Provisional Application No. 60/320,268, filed Jun. 13, 2003.

BACKGROUND OF INVENTION

1. Field of the Invention

The present invention generally relates to the general field of propulsion and thrust generation in the low-gravity (orbital) and zero-gravity environments of outer space. More particularly, this invention relates to a system and method for supplying thrust to a satellite or spacecraft for the purpose of performing station keeping and attitude control maneuvers.

2. Description of the Related Art

The capabilities for station keeping and attitude control are of critical importance in nearly all orbital and spaceflight systems. Station keeping involves maintaining a desired orbit and/or orientation, despite the influence of forces such as inhomogeneous gravity fields, micrometeorite impacts, and electromagnetic forces. Geosynchronous satellites are an excellent example of station keeping, where their position and alignment are essential to provide uninterrupted service to terrestrial customers. Attitude control generally refers to the control of spacecrafts, such as vessels or ships for transporting humans and cargo, which need to perform maneuvers for various activities such as docking, surveillance, repair or maintenance work, scientific experiments, and re-entry positioning, to name just a few. The ability to provide station keeping and attitude control is therefore seen as an essential element of spaceflight. Such systems may be required to be low-cost, reliable, easily maintained, efficient, fast, environmentally-friendly, and flexible in their design, depending upon the specific mission requirements demanded of them.

The current state of the art in orbital transfers and station keeping involve reaction rockets using a variety of fuels, either chemical (liquid, gaseous, or solid fuel), thermal rockets, or electromagnetic accelerating devices (ion thrusters, magnetohydrodynamics). Chemically-fueled rockets require that fuel be brought along, and this limits the performance of the rocket through the rocket equation.

$$\Delta V = I_{sp} \cdot g \cdot \ln(M_o/M_f)$$

where $\Delta V$ is the velocity change given the specific impulse of the rocket motor ($I_{sp}$), the gravitational constant (g), and the logarithm of the ratio of weights before ($M_o$) and after ($M_f$) the burn. Chemical rockets, typically those used for attitude control, may include hazardous chemicals, such as hydrazine, which are highly toxic, and require particular care in fueling, maintenance, and decommissioning. Chemical rockets can be refuelable, though such fuels must typically be produced from terrestrial-based manufacturing facilities. Launching the necessary replacement fuel is quite expensive. Chemical rockets also produce various byproducts, depending on the chemical reaction used to generate the force. These byproducts may be detrimental to the operation of a space vehicle, producing heat, dust, gas, or residues. Chemical rockets also typically involve a number of moving parts and control circuitry which influences their complexity and component count, thereby negatively impacting reliability.

Thermal rockets typically rely on a heat source to impart a high velocity to gaseous atoms, which are directed out a nozzle to generate thrust. A common source of heat is a radioactive isotope, such as strontium. The environmental consequences of a failed launch or a satellite reentry may be unacceptably dangerous. The gaseous atoms are also typically a substance which may be abundant on Earth but rare in space, therefore requiring the expense of launching replacement fuel.

Electromagnetically accelerated rockets, such as the electrostatic ion engine, typically use some gaseous fuel which is ionized and then accelerated to produce thrust.

Engines of this type are efficient, however, their specific impulse is generally quite low and they are therefore of limited use in space mission applications. More powerful methods of electromagnetic rocket engines have been proposed, however, these are more typically aimed at providing main thrust and not necessarily station keeping or attitude control.

In view of the above, existing methods of station keeping and attitude control suffer from a variety of drawbacks. It would therefore be desirable if improved performance of station keeping and attitude control system could be achieved with the convenience of freedom from terrestrial fuel sources and simple refueling using materials commonly found in space environments.

SUMMARY OF INVENTION

The present invention provides a system and method for supplying thrust to a structure in a low-gravity (orbital) or zero-gravity environment, such as a satellite or spacecraft, for the purpose of station keeping or attitude control of the structure.

The system comprises means for emitting energy beams and targets impacted by the energy beams to cause ablation of the targets. The emitting means and targets are adapted to cooperate and cause the structure to undergo translational and/or rotational motion in reaction to the motion of material ablated from the targets.

In view of the above, the method of this invention involves controlling at least one of the position, alignment, and attitude of a structure in a zero or low-gravity environment by emitting energy beams at targets so that the energy beams impact the targets and cause ablation of the targets, and so that the structure undergoes translational and/or rotational motion in reaction to the motion of the material ablated from the targets.

A significant advantage of this invention is the ability to generate appreciable levels of thrust without the use of fuels that are available only from terrestrial sources. Instead the targets, which effectively serve as the fuel for the system, can be formed of materials available from nonterrestrial sources, including the operating environments of satellites and spacecraft. In addition, the targets can be formed of nonhazardous materials, thereby avoiding the risks involved with the use of chemical and thermal rockets. A variety of configurations are possible that provide great flexibility in system design, and allow the mission planner to optimize various performance and reliability metrics for their particular objectives. As such, an additional advantage of the invention is the capability of achieving improved performance in station keeping and attitude control of satellites and spacecrafts.

Other objects and advantages of this invention will be better appreciated from the following detailed description.

DETAILED DESCRIPTION

Figure 1:
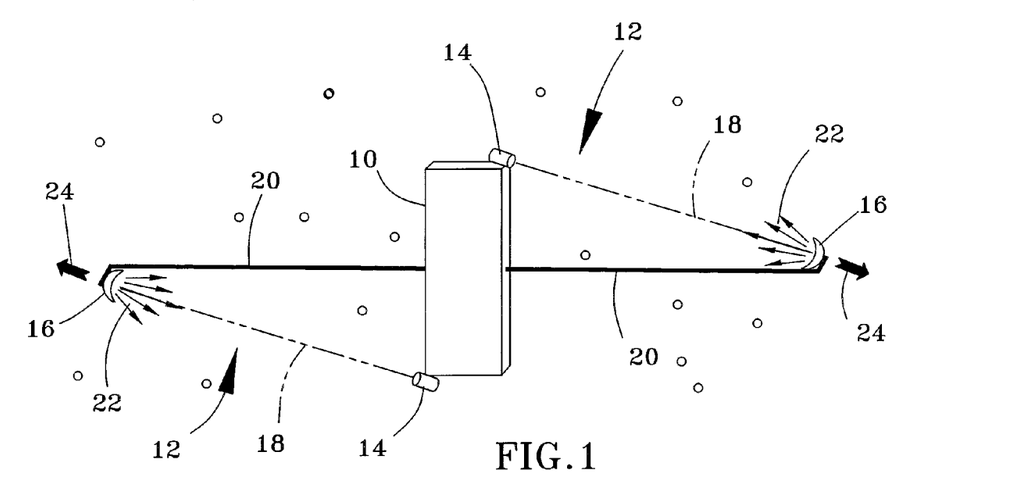
FIG. 1 represents a structure, such as a satellite or spacecraft, equipped with a thruster system adapted to impart momentum to the structure in a low or zero-gravity environment in accordance with an embodiment of this invention.

General concepts of the invention are represented in FIG. 1, which depicts a technique for imparting momentum to a space structure 10, such as a satellite or spacecraft, with solid-state thruster units 12. Each thruster unit 12 comprises an energy source 14 that generates and aims a high-energy beam 18 at a target 6. The energy sources 14 may be, for example, guns that generate laser or electron beams. Each target 16 is formed of a solid material capable of being sputtered, vaporized or otherwise ablated by the beam 18 impacting the target 16. For example, suitable targets materials for use with a laser beam include opaque materials such as metals and many types of minerals and ceramics, and suitable targets materials for use with an electron beam include electrically-conductive substances such as metals and semiconductors. The energy sources 14 and targets 16 can be rigidly attached to the structure 10 or interconnected with the structure 10, such as with braces 20 as depicted in FIG. 1. Alternatively, the energy sources 14 may be moveably mounted to the structure 10 or braces 20 for their protection and improved control. Each energy source 14 directs its energy beam 18 at one of the targets 16, which in turn is ablated by the beam 18 to generate what is termed herein a byproduct 22. The byproducts 22 ablated from the targets 16 carry a momentum, and by Newton's second law, a reaction force 24 is applied to the remainder of each target 16.

Figure 9:
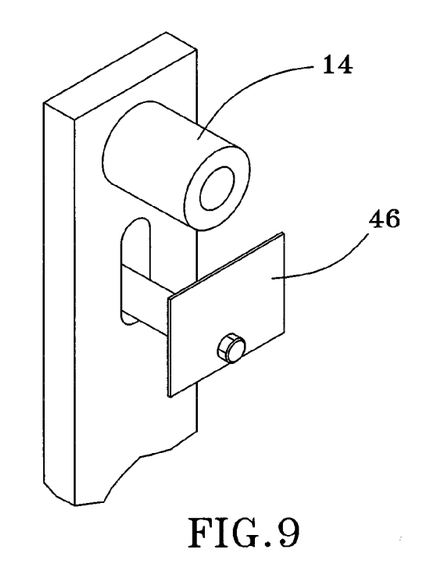
FIGS. 9, 10 and 11 represent three shutter systems suitable for use with any of the embodiments of FIGS. 1 through 7.
Figure 10:
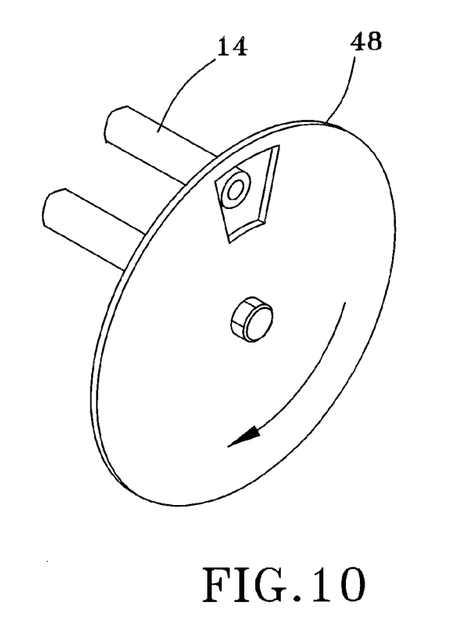
Figure 11:
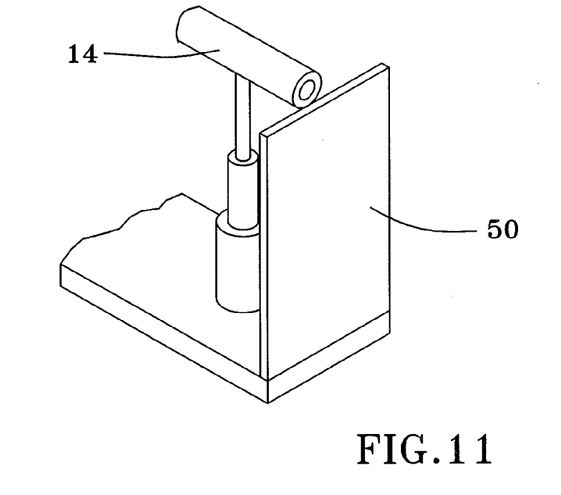

The targets 16 are represented in FIG. 1 as curved or saucer-shaped and deflecting the byproduct 22 generally in a direction back toward their respective energy sources 14. Specifically, some of the arrows representing the trajectory of the byproduct 22 are directed along the path of the beam 18 toward the source 14 of the beam 18, while other arrows spread radially outward depicting a scattering of the byproduct 22 away from the source 14. While the former is more efficient in terms of energy consumed versus the magnitude of the force applied to induce motion of the structure 10, a drawback is the tendency for the byproduct 22 to collect on the beam openings of the energy sources 14. To minimize or prevent buildup of byproducts 22 on the beam openings, the energy sources 14 can be equipped with shutters of a type known in the art. Examples of suitable shutter systems are represented in FIGS. 9, 10 and 11, which depict, respectively, a moveable shutter plate 46, a rotating shutter disk 48, and a stationary shutter plate 50 in combination with a movable energy source 14. Also, the targets 16 can be shaped or the energy sources 14 operated to increase or decrease the relative amounts of byproduct 22 deflected toward and away from the sources 14. Various other configurations are also possible for the targets 16. For example, some or all of the targets 16 could be in the form of consumable bars, such as long rods of material, the outer ends of which are ablated by the beams 18. Targets 16 of this type may require accurate pointing of the beam as the rod is consumed. One advantage of this type of target is the ease of replacement, since a bar can be affixed at one end through a simple mechanism (not shown). A further advantage for rod-shaped targets together with a means for accurately pointing the beam 18 is that minimal or no damage to the structure 10 occurs when the target 16 is missing or fully consumed. Alternatively, the targets 16 could be shaped and arranged much like the blades of a pinwheel. In such a configuration, the byproducts 20 would be thrown radially outward at an angle from the center of mass of the structure, with the effect of stabilizing the structure 10 by causing it rotate, much like a flywheel.

Figure 2:
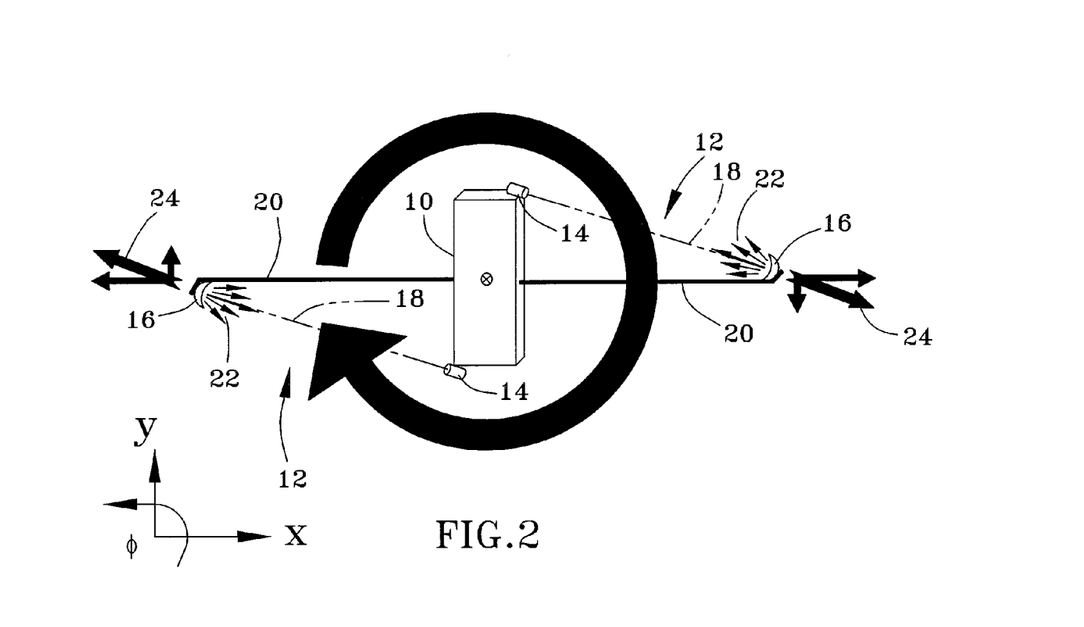
FIG. 2 represents a technique for imparting a rotational force by using partially-balanced thrusters in accordance with an embodiment of this invention.

FIG. 2 represents the arrangement of thruster units 12 in FIG. 1 as cooperating to impart a rotational force on the space structure 10 as a result of the arrangement of the thruster units 12 being only partially balanced. In reference to the coordinate system chosen to illustrate the invention, the structure 10 can be seen to rotate about an axis normal to the x-y plane and coinciding with the center of mass of the structure 10. Rotation is the result of the reaction forces 24 being substantially parallel but not collinear, and acting in substantially opposite directions, forming what is termed a couple. The reaction forces 24 are preferably equal in magnitude and their lines of action (represented as coinciding with the beams18) are preferably equidistant from the center of mass of the structure 10. As a result, the x-components of the reaction forces 24 balance each other while their y-components act in equal but opposite directions at distances (moment arms) from the center of mass of the structure 10 to cause rotation of the structure 10 about its center of mass.

Figure 3:
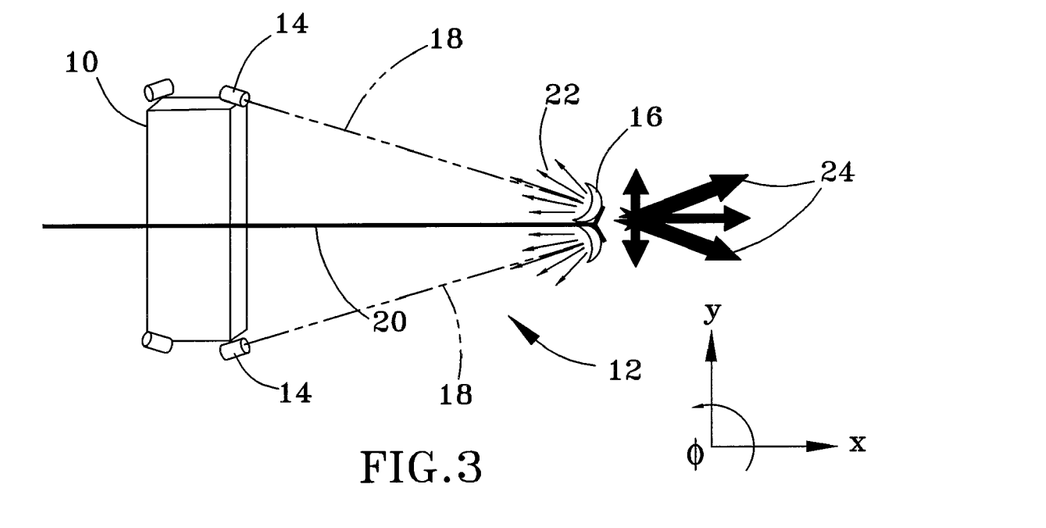
FIG. 3 represents a technique for imparting a translational force by using partially-balanced thrusters in accordance with an embodiment of this invention.

By adding or repositioning a thruster unit 12 as represented in FIG. 3, a translational force can be selectively generated, shown here as occurring in the x direction. As with FIG. 2, the reaction forces 24 in FIG. 3 are preferably equal in magnitude, with their lines of action represented as coinciding with the beams18. However, the reaction forces 24 are not parallel, but instead are oriented equiangularly from the x-axis through the center of mass of the structure 10. As a result, the y-components of the reaction forces 24 balance each other while their x-components combine to cause translation of the structure 10.

Figure 4:
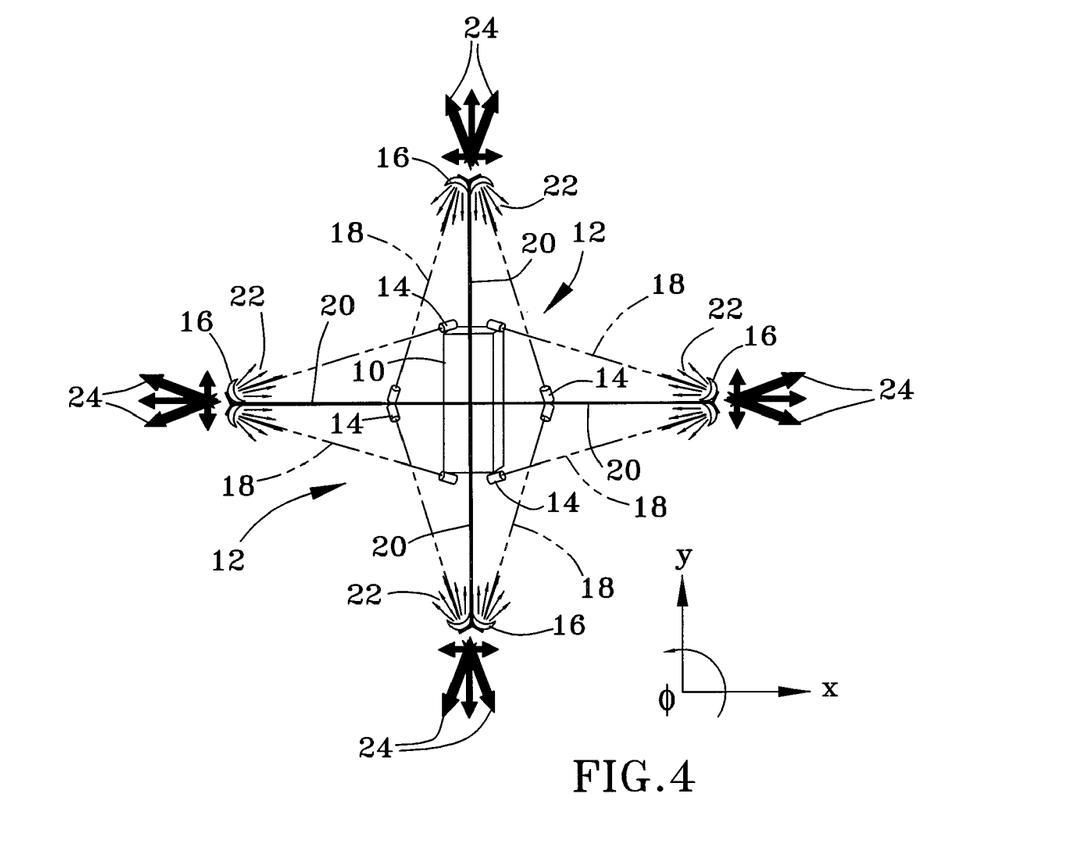
FIG. 4 represents a technique for producing both rotational and translational forces by generating partially and mutually-balanced thrusts in accordance with an embodiment of this invention.

From FIGS. 2 and 3, it is evident that both rotational and translational forces can be generated by partially and mutually-balanced thruster units 12. Such a configuration in a two-dimensional form is represented in FIG. 4, in which energy sources 14 are shown as being mounted on the structure 10 and two of its braces 20, with energy beams 18 being directed at targets 16 located at the extremities of the braces 20. With this arrangement, rotation can be imparted in either direction about the axis normal to the x-y plane and coinciding with the center of mass of the structure 10, and translation can be imparted in the positive and negative x and y directions, including combinations thereof.

Figure 5:
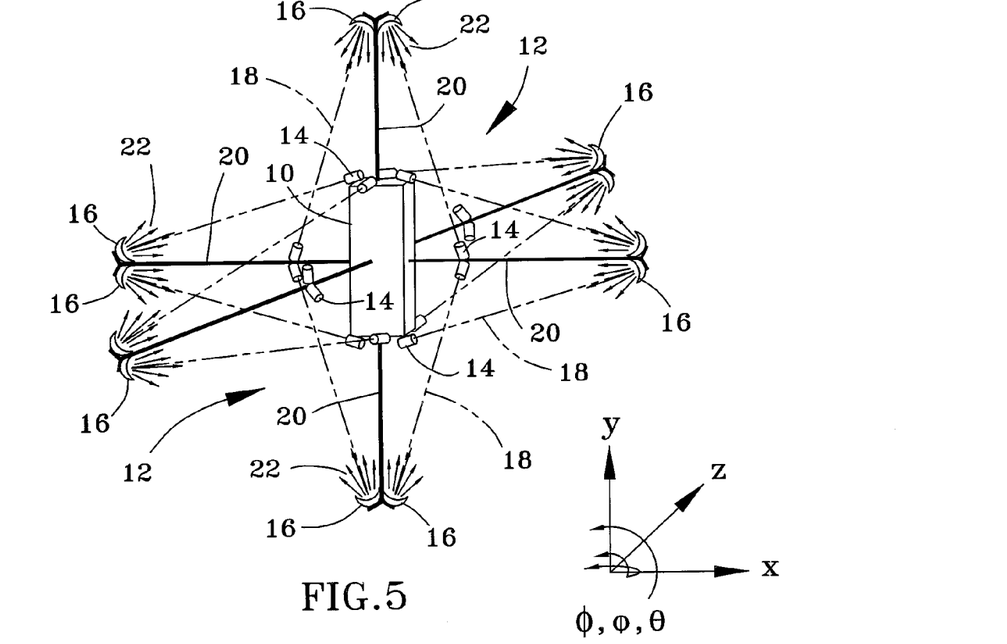
FIG. 5 represents a fully three-dimensional thruster system using partially and mutually-balanced thrusters in accordance with an embodiment of this invention.

FIG. 5 represents a fully three-dimensional thruster system achieved by adding two additional braces 20 extending in the positive and negative z-directions of the represented coordinate system, and equipping the structure 10 with additional energy sources 14 and targets 16 arranged to produce reaction forces acting in the y-z plane. As a result, the thruster system provides the structure 10 with six independent degrees of freedom-translation along each of the x, y and z axes, and rotation about each of the x, y and z axes. In FIG. 5, sixteen energy sources 14 are shown as being used, though twelve sources 14 could be used and still achieve full maneuvering capabilities. For example, the energy sources 14 mounted to the z-axis braces 20 could be eliminated while still achieving translation in the y-axis through the operation of the energy sources 14 mounted to the x-axis braces 20.

Figure 6:
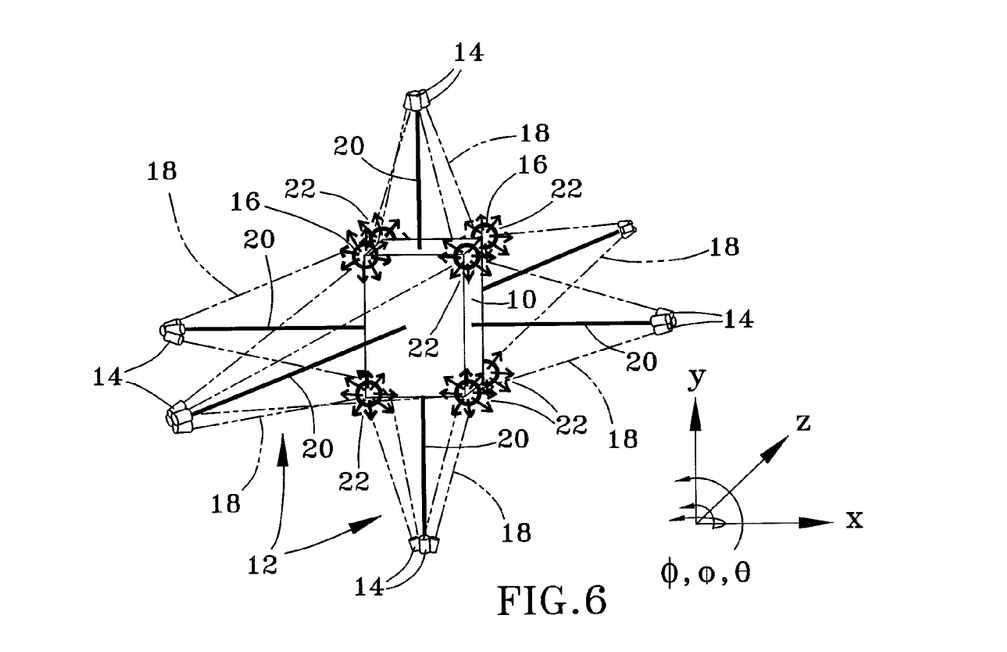
FIG. 6 represents an alternative configuration for a fully three-dimensional thruster system using targets situated so that ablated byproducts are ejected away from the structure.
Figure 7:
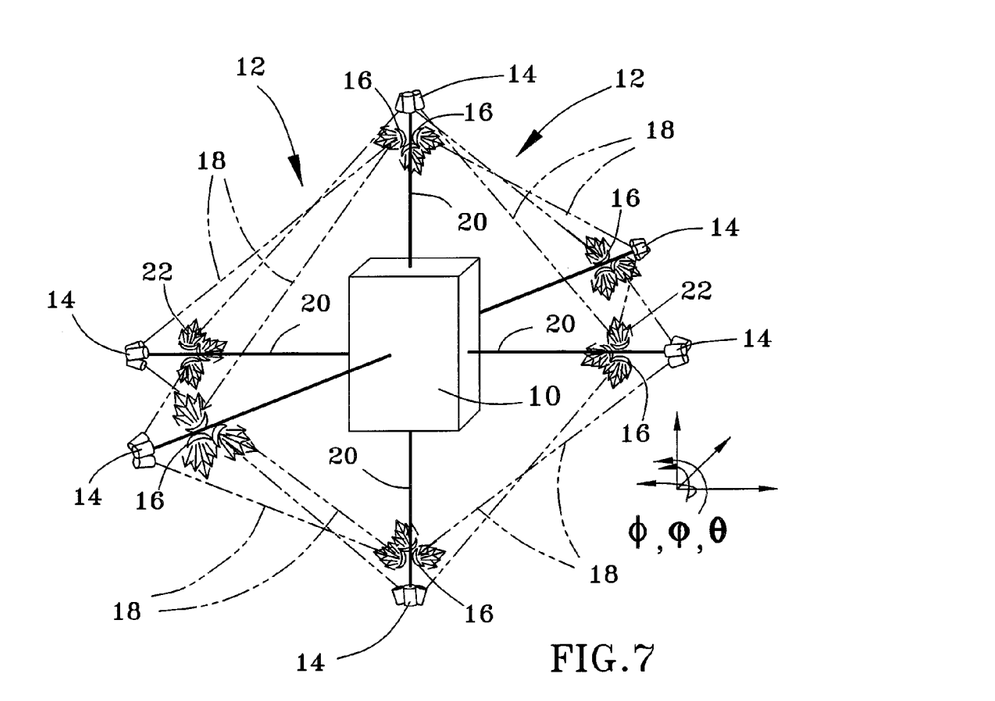
FIG. 7 represents another alternate configuration for a fully three-dimensional thruster system using targets positioned to provide large moment arms and direct ablated byproducts away from the structure.

FIG. 6 represents an alternative configuration to FIG. 5, in which the energy sources 14 are moved to the extremities of the braces 20 and the targets 16 are mounted to the structure 10. An advantage to this configuration is that the ablated byproducts 22 are ejected away from the structure 10. FIG. 7 represents another alternate configuration that places both the energy sources 14 and their targets 16 on the braces 20. The embodiment of FIG. 7 provides larger moment arms than what is shown in FIG. 6, while also having the advantage of ensuring that ablated byproducts 22 are generated some distance from the structure 10 and are ejected in directions away from the structure 10.

The structures 10 depicted in the Figures are schematically represented for illustrative purposes only. The braces 20 that provide the required spacing between the energy sources 14, targets 16, and the structure 10 could be incorporated into or constitute parts of other systems integrated with the structure 10. For example, the structure 10 may utilize solar panels or antenna that could provide the needed spatial configuration for the sources 14 and their targets 16. Doing so would involve appropriately placing the sources 14 and targets 16 to provide the desired six independent degrees of freedom. Furthermore, while a set number of thruster units 12 are depicted in the Figures, the structure 10 could be equipped with essentially any number of thruster units 12, some of which might comprise a single energy source 14 and multiple targets 16 at which the source 14 can be selectively aimed.

Figure 8:
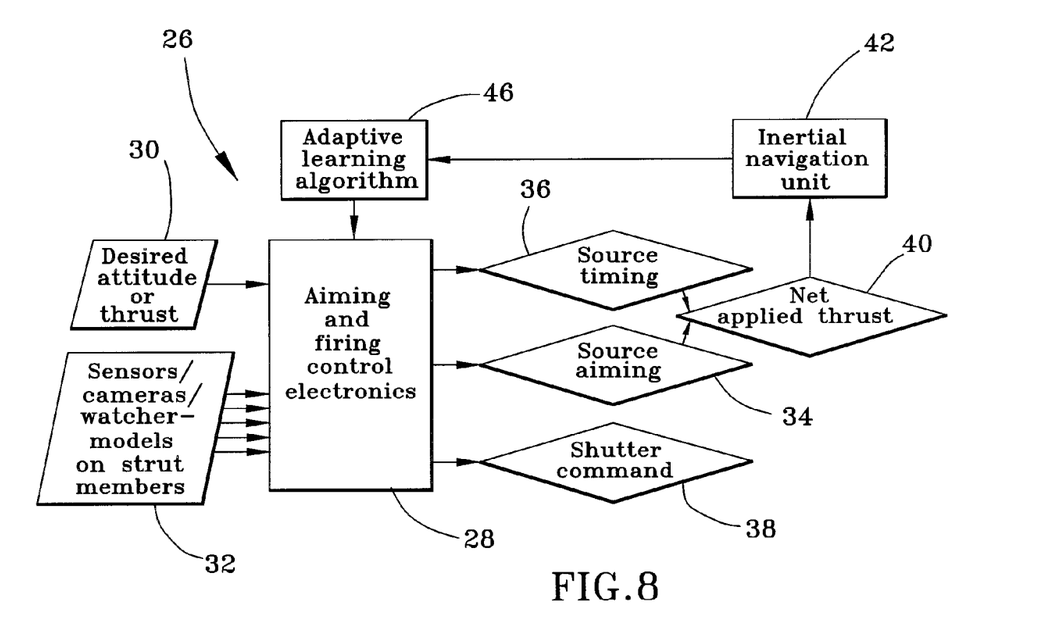
FIG. 8 schematically represents a control system for thruster systems of the invention.

A control system 26 for the thruster systems of this invention is schematically represented in FIG. 8. The control system 26 includes control electronics 28 that controls the aiming and firing of the thruster units 12. The control electronics 28 is preferably adapted to receive various inputs, such as information 30 regarding the desired thrust from the thruster units 12 and the desired position and alignment (station-keeping for a satellite) or attitude (for a spacecraft) of the structure 10. The control electronics 28 is also preferably adapted to receive inputs from devices 32 such as sensors and cameras that monitor the position-alignment-attitude of the structure 10 and the condition of the other equipment on the structure 10. The control electronics 26 delivers control signals to various devices, such as devices 34 for aiming the energy sources 14, devices 36 for controlling the timing the firing of the energy sources 14, and devices 38 for controlling the shutters (if present) over the beam openings of the energy sources 14 to prevent buildup of byproducts 22 on the beam openings. The timing and aiming of the individual energy sources 14 can be used to compute a net applied thrust 40 to the structure 10, which in combination with an inertial navigation unit 42 and a learning control system 44 defines a feedback loop for the control electronics 28 that improves the precision of the attitude and station-keeping capabilities of the invention. In particular, the learning control system 44 monitors the movement of the structure 10 resulting from the operation (aiming, firing and timing) of the energy sources 14, and with an adaptive learning algorithm adjusts the power/time parameters of the energy sources 14 in a self-learning manner to optimize the control of the structure 10.

The length of the braces 20 in combination with the forces applied to them may cause the braces 20 to flex or vibrate. Under certain conditions it may be possible to excite the braces 20 into resonance. While vibrations may not be of concern in some applications, vibrational moments are preferably accounted for and adaptive. For example, the control system 26 may include means for flexing the braces 20 in order to alter the rigidity of the braces 20 and thereby counteract or suppress induced vibrations. A further means may include adjusting the duty cycle, or on/off sequence, of the beams 18 to avoid sympathetic resonance in the braces 20.

In view of the above, the present invention provides the capability of achieving improved performance in station keeping and attitude control of satellites and spacecrafts in low-gravity (orbital) and zero-gravity environments. The system and method make use of thrust-generating units that can be entirely made up of solid-state components that are self-contained with the satellite or spacecraft being maneuvered. Thrust is provided by the forceful ablation with a laser, electron or particle beam 18 of targets 16 that can be formed of essentially any material, and therefore can be readily replaced to making refueling simple and inexpensive. Several methods of positioning, alignment and attitude control are possible, bringing a wide range of benefits and tradeoffs in the design considerations of the entire system.

While the invention has been described in terms of a preferred embodiment, it is apparent that other forms could be adopted by one skilled in the art. Therefore, the scope of the invention is to be limited only by the following claims.

The invention claimed is:

1. An apparatus comprising a structure, support means extending from the structure, and a system for controlling at least one of the position, alignment, and attitude of the structure in a zero or low-gravity environment, the system comprising targets and means for emitting energy beams directly at surfaces of the targets whereby the targets are impacted by the energy beams to cause ablation of the targets, wherein at least one of the emitting means and the targets is mounted to the support means so as to be positioned apart from the structure, and wherein the system further comprises means for causing the emitting means and the targets to cooperate and selectively induce translation and rotation motion of the structure in any of six independent degrees of freedom in reaction to motion of material ablated from the targets.

2. The apparatus according to claim 1, wherein the emitting means comprises a laser gun and the energy beam thereof is a laser beam.

3. The apparatus according to claim 1, wherein the emitting means comprises an electron gun and the energy beam thereof is an electron beam.

4. The apparatus according to claim 1, wherein the targets are shaped such that some of the material ablated from each of the targets travels toward the emitting means from which the impacting energy beam is emitted, the structure further comprising means for controlling the amount of the material that collects on the emitting means as a result of being deflected by the targets to travel toward the emitting means.

5. The apparatus according to claim 1, wherein the support means comprises braces extending in opposite directions from the structure along at least one axis of the structure, at least one of the emitting means and the targets being mounted to the braces.

6. The apparatus according to claim 5, wherein the emitting means comprises at least two energy beam sources mounted to the structure, the targets comprise first and second targets mounted to opposite ends of the braces, and the two energy beam sources and the first and second targets are adapted to cooperate and cause the structure to undergo rotation in reaction to the motion of the material ablated from the first and second targets by the energy beam sources.

7. The apparatus according to claim 5, wherein the braces are rigid.

8. The apparatus according to claim 5, wherein the emitting means comprises at least two energy beam sources mounted to the structure, the targets comprise a first target mounted to one of the braces, and the two energy beam sources and the first target are adapted to cooperate and cause the structure to undergo translation in reaction to the motion of the material ablated from the first target by the energy beam sources.

9. The apparatus according to claim 1, wherein the targets are formed of at least one of mineral and ceramic materials.

10. The apparatus according to claim 1, wherein the causing means comprises means for adjustably aiming the energy beams at the targets.

11. The apparatus according to claim 1, wherein the support means comprises braces extending in opposite directions from the structure along three axes of the structure, at least one of the emitting means and the targets being mounted to the braces.

12. The apparatus according to claim 11, wherein the emitting means comprises energy beam sources mounted to the structure, the targets comprise targets mounted to opposite ends of the support means, and the energy beam sources and the targets are adapted to cooperate and cause the structure to selectively undergo translation along each of the axes and rotation about each of the axes in reaction to the motion of the material ablated from the targets.

13. The apparatus according to claim 11, wherein the emitting means comprises energy beam sources mounted to opposite ends of the support means, the targets comprise targets mounted to the structure, and the energy beam sources and the targets are adapted to cooperate and cause the structure to selectively undergo translation along each of the axes and rotation about each of the axes in reaction to the motion of the material ablated from the targets.

14. The apparatus according to claim 11, wherein the emitting means comprises energy beam sources mounted to opposite ends of the support means, the targets comprise targets mounted to the support means adjacent the energy beam sources, and the energy beams emitted by the energy beam sources impact the targets not mounted to the same support means as the energy beam source thereof so as to cause the structure to selectively undergo translation along each of the axes and rotation about each of the axes in reaction to the motion of the material ablated from the targets.

15. The apparatus according to claim 1, wherein the structure is a satellite and the motion is a station-keeping maneuver.

16. The apparatus according to claim 1, wherein the structure is a spacecraft and the motion is an attitude control maneuver.

17. The apparatus according to claim 1, wherein at least some of the surfaces of the targets are curve-shaped such that some of the material ablated from each of the targets travels away from the emitting means from which the impacting energy beam is emitted.

18. The apparatus according to claim 1, wherein at least one of the targets is impacted by multiple energy beams.

19. The apparatus according to claim 18, wherein the surface of the at least one target is curve-shaped.

20. The apparatus according to claim 4, wherein the controlling means comprises means for adjustably aiming of the energy beams at the curve-shaped surfaces of the targets.

21. The apparatus according to claim 4, wherein the controlling means comprises shutters.

22. An apparatus comprising:
a structure;
support means extending from the structure; and
a system for controlling at least one of the position, alignment, and attitude of the structure in a zero or low-gravity environment, the system comprising:
  targets;
  means for emitting energy beams at the targets whereby surfaces of the targets are impacted by the energy beams to cause ablation of the targets;
  means for causing the emitting means and the targets to cooperate and selectively induce translation and rotation motion of the structure in any of six independent degrees of freedom in reaction to motion of material ablated from the targets, wherein the causing means comprises means for adjustably aiming and firing of the emitting means;
wherein at least one of the emitting means and the targets is mounted to the support means so as to be positioned apart from the structure; and
wherein at least some of the surfaces of the targets are curve-shaped such that some of the material ablated from each of the targets travels away from the emitting means from which the impacting energy beam is emitted.

23. The apparatus according to claim 22, further comprising means in communication with the controlling means for sensing at least one of the position, alignment, and attitude of the structure.

24. The apparatus according to claim 22, further comprising means in communication with the controlling means for sensing the firing of the emitting means.

25. The apparatus according to claim 24, further comprising feedback means that senses at least one of the position, alignment, and attitude of the structure, performs an adaptive learning algorithm to produce modified position, alignment, or attitude data, and communicates the modified position, alignment, or attitude data to the controlling means.

26. A method for controlling at least one of the position, alignment, and attitude of an apparatus located in a zero or low-gravity environment and comprising a structure and support means extending therefrom, the method comprising the steps of mounting targets to at least one of the structure and the support means, emitting energy beams directly at the targets from at least one of the structure and the support means so that the energy beams impact the targets and cause ablation of the targets to selectively induce translation and rotation motion of the structure in any of six independent degrees of freedom in reaction to motion of material ablated from the targets.

27. The method according to claim 26, further comprising at least one step chosen from the group consisting of:
adjustably aiming at least one source of the energy beams on a curved surface of at least one of the targets to prevent at least some of the ablated material deflected by the at least one targets from collecting on the at least one source; and
operating shutters associated with sources of the energy beams to prevent at least some of the ablated material deflected by the targets from collecting on the sources.

28. The method according to claim 26, wherein at least two of the energy beams are emitted in directions away from the structure, the targets are spaced apart from the structure, and the structure undergoes rotation in reaction to the motion of the material ablated from the targets by the at least two energy beams.

29. The method according to claim 26, wherein at least two of the energy beams are emitted in directions away from the structure toward a first of the targets spaced apart from the structure, and the structure undergoes translation in reaction to the motion of the material ablated from the first target by the at least two energy beams.

30. The method according to claim 26, wherein the energy beams are emitted in directions away from the structure, the targets are spaced apart from the structure, and the structure undergoes translation and rotation in reaction to the motion of the material ablated from the targets.

31. The method according to claim 26, wherein the energy beams are emitted in directions away from the structure, the targets are spaced apart from the structure, and the structure undergoes translation along each of three axes and rotation about each of the three axes in reaction to the motion of the material ablated from the targets.

32. The method according to claim 26, wherein the energy beams are emitted in directions toward the structure and the targets, and the structure undergoes translation along each of three axes and rotation about each of the three axes in reaction to the motion of the material ablated from the targets.

33. The method according to claim 26, further comprising controlling aiming and firing of the energy beams.

34. The method according to claim 26, further comprising controlling aiming and firing of the energy beams in response to sensing of at least one of the position, alignment, and attitude of the structure.

35. The method according to claim 26, further comprising controlling aiming and firing of the energy beams in response to sensing of the motion of the structure.

36. The method according to claim 35, further comprising sensing at least one of the position, alignment, and attitude of the structure, performing an adaptive learning algorithm to produce modified position, alignment, or attitude data, and modifying the aiming and firing of the energy beams in response to the modified position, alignment or attitude data.

37. The method according to claim 26, wherein the structure is a satellite and the motion is a station-keeping maneuver.

38. The method according to claim 26, wherein the structure is a spacecraft and the motion is an attitude control maneuver.

* * * * *